UNITED STATES PATENT OFFICE.

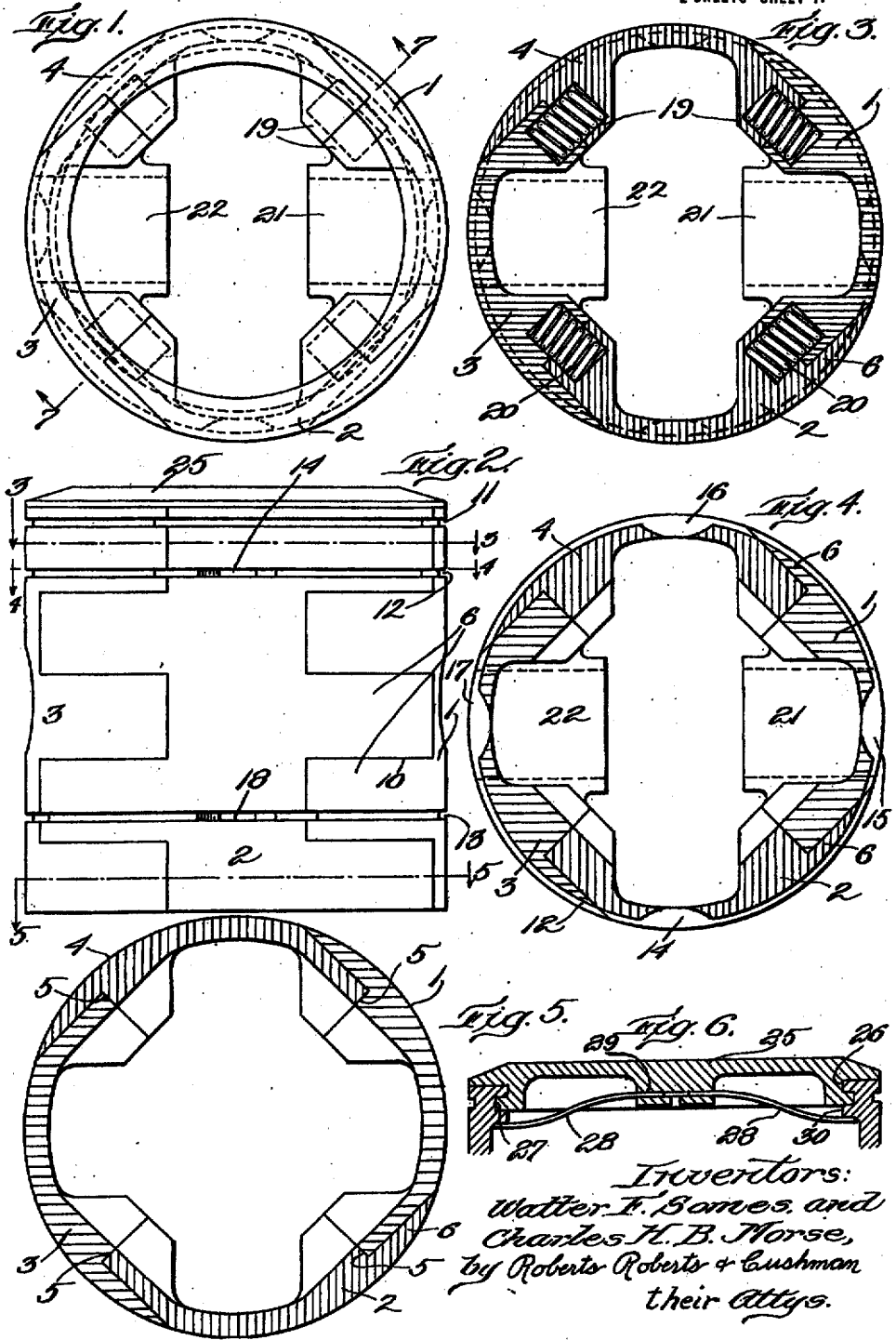

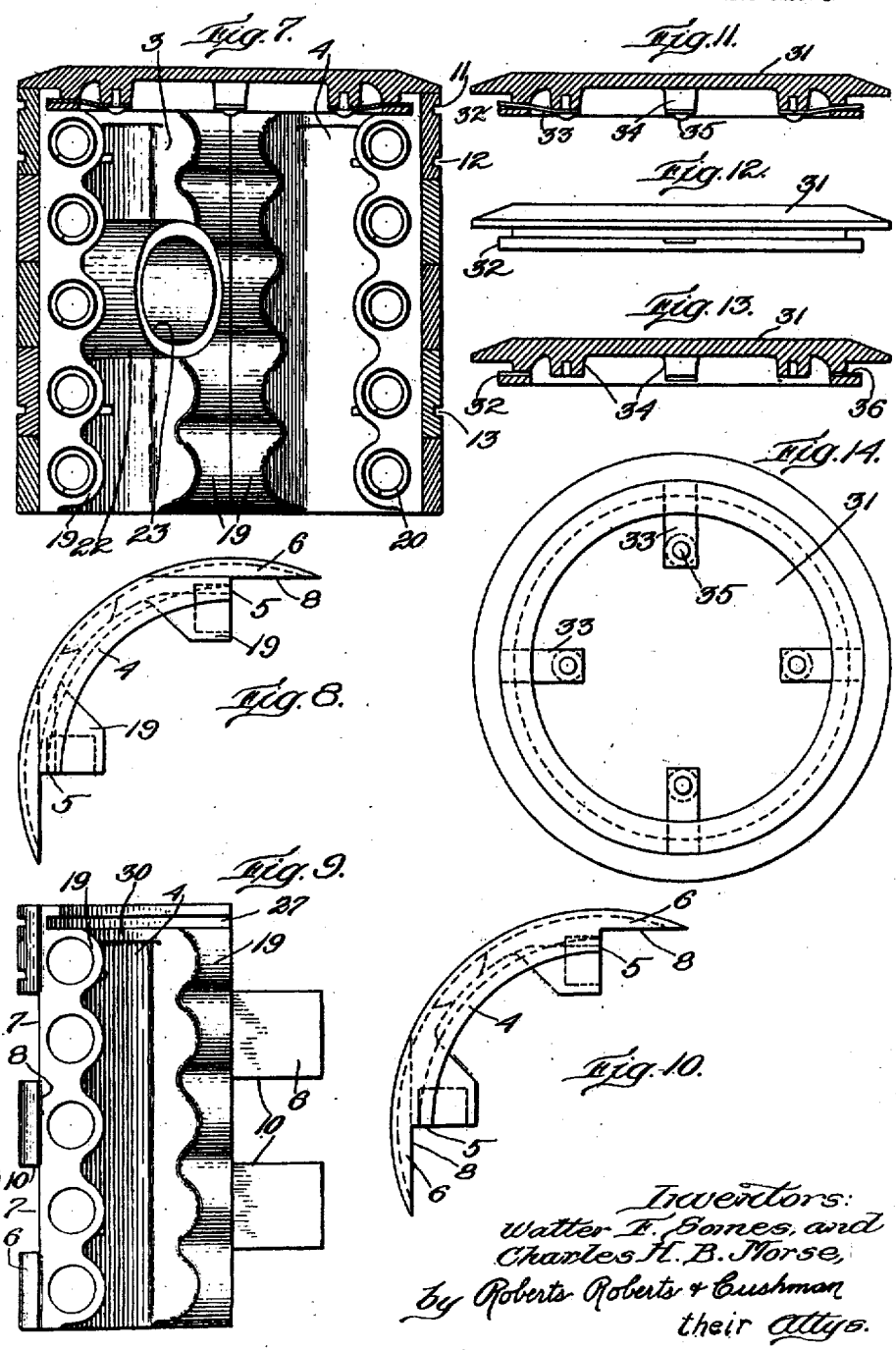

WALTER F. SOMES, OF JAMAICA PLAIN, AND CHARLES H. B. MORSE, OF BOSTON, MASSACHUSETTS.

PISTON.

1,402,679.  Specification of Letters Patent.  Patented Jan. 3, 1922.

Application filed May 24, 1919. Serial No. 299,592.

*To all whom it may concern:*

Be it known that we, WALTER F. SOMES and CHARLES H. B. MORSE, citizens of the United States, and residents of Jamaica Plain and Boston, in the counties of Suffolk and Norfolk and State of Massachusetts, have invented new and useful Improvements in Pistons, of which the following is a specification.

This invention relates to a piston and more particularly to a piston without piston rings especially adapted for use in internal combustion engines.

We are aware that the prior art discloses pistons having followers comprising segments adjustable radially for taking up wear and for centering the pistons within the cylinders. These followers do not take the place of the usual piston rings nor do they supplement them in making a gas or steam tight joint between the pistons and the cylinder walls. Furthermore, to effect radial adjustment of the segments of a follower of this type it is necessary to remove the piston from the cylinder.

Pistons customarily employed in internal combustion engines are provided with one or more expansible piston rings. These rings are a great source of trouble as they must be made from spring metal and when subjected to the high temperature existing in the cylinder of the engine, they become brittle and break thereby becoming useless. To replace broken rings it then becomes necessary to take down the engine and remove the piston from the cylinder.

It is the principal object of our invention to provide an improved piston particularly adapted for use in internal combustion engines which entirely obviates the necessity of employing piston rings. More particularly an object of the invention is to provide an improved piston comprising a plurality of longitudinal sections having overlapping portions or tongues automatically expansible to maintain a tight fit within the cylinder. A further object is to provide a piston which is self-adjusting and self-aligning within the cylinder, and which need not be removed from the cylinder for adjustment. A still further object of the invention is the provision of a piston with self-adjusting wall sections and a head which is combined with the adjustable wall sections in a manner to allow easy assembly, and a strong tight connection with the sections which permits them to adjust themselves to the cylinder walls. A further object of the invention is the provision of a self-adjusting piston comprising few and simple parts which is durable and easily assembled.

In one aspect the invention consists in providing a piston having a plurality of longitudinal sections provided with overlapping portions adapted to slide tangentially over each other, which sections are urged outwardly against the cylinder wall by a plurality of springs. These sections are constantly pressed against the cylinder wall so as to maintain at all times a gas tight fit between the piston and cylinder. The sections further overlap at their abutting edges in such manner as to maintain a gas tight fit between each other. With this construction the entire outer cylindrical surface of the piston acts as a piston ring providing thereby a much tighter fit than heretofore attained.

In another aspect the invention consists in providing a self-adjusting piston of the type above outlined with a head which is so assembled thereto as to allow relative radial movement between it and the sections whereby the sections may automatically adjust themselves to the walls of the cylinder, unrestrained by such head.

In another aspect the invention consists in providing a piston having self-adjusting segments with connecting rod pin seats in the form of bosses into which the ends of the pin may be seated.

In order to set forth the nature of the invention, we have illustrated certain embodiments thereof in the accompanying drawing, in which—

Figure 1 is a top view of the piston with the head removed;

Fig. 2 is an elevational view of the piston;

Fig. 3 is a transverse section on line 3—3 of Fig. 2, the springs being shown in elevation;

Fig. 4 is a transverse section on line 4—4 of Fig. 2;

Fig. 5 is a transverse section on line 5—5 of Fig. 2;

Fig. 6 is a transverse section through one form of piston head;

Fig. 7 is a longitudinal section on line 7—7 of Fig. 1;
Fig. 8 is a top view of one of the piston sections;
Fig. 9 is an elevational view of a section;
Fig. 10 is a bottom view of a section;
Fig. 11 is a transverse section through another form of piston head;
Fig. 12 is a side view of the head;
Fig. 13 is a transverse section through the head with the spring fingers omitted; and
Fig. 14 is a bottom view of the head.

Referring to the drawings, the piston is provided with four longitudinal sections 1, 2, 3 and 4 whose longitudinal edges 5 abut in radial planes to form the cylindrical wall of the piston. These sections are provided along each of their longitudinal edges with tongues 6 alternated with depressions 7 as clearly appears in Fig. 9. The inner faces 8 of the tongues and the bottoms 9 of the depressions are formed as plane tangential surfaces both lying in the same plane parallel to the axis and the tongues 6 on the edges of one section lying in depressions 7 in the abutting edges of the adjoining sections thereby forming radially overlapped portions. The top and bottom edges 10 of the tongues lie in planes at right angles to the axis of the piston and the edge of a tongue forms a continuation of the side of a depression which adjoins it. The tongues on one edge of a section are placed in staggered relation to the tongues on the other edge of the same section so that the tongues on one edge are opposite depressions on the other edge.

Oiling grooves 11, 12 and 13 are formed in the outer circumferential surface of the sections to form continuous peripheral oiling grooves in the cylindrical surface of the assembled piston. Grooves 11 and 13 are provided in each section with a portion cut entirely through the wall of the section to form oil holes as at 14, 15, 16, 17 and 18 for admitting oil from the interior of the piston to the oil grooves and from thence to the cylinder walls.

Along each longitudinal edge 5 of each section and on the inner surface thereof a series of chambered bosses 19 is formed, the bosses on the abutting longitudinal edges of two sections being in alignment. These bosses are adapted to receive coiled compression springs 20. These springs are shown assembled in the bosses 19 in Fig. 3.

Cast integrally on the interior wall of sections 1 and 3 are bosses 21 and 22, chambered as at 23 and 24 to receive the ends of a connecting rod pin.

The top of the piston may be closed as shown in Fig. 6 by a head 25 having a peripheral flange 26 fitting into a circumferential groove 27 cut in the inner wall surfaces of the piston sections 1, 2, 3 and 4.

The head 25 is thus retained on the piston sections by the flange and groove connection, but to insure a gas tight joint, the head is held in close contact with the upper end of the wall sections by springs 28 which are secured in the central boss 29 positioned on the under side of head 25 and which engage at their free ends beneath the bead 30 formed on the piston wall sections directly beneath groove 27.

In place of the head above described, the top of the piston may be closed by a modified head plate 31 shown in Figs. 11, 12, 13 and 14, which is provided with a peripheral flange 32 for co-operation with the groove 27 in the piston wall sections 1, 2, 3 and 4. The head is held in close contact with the end of the piston by springs 33 secured to bosses 34 by screws 35. These springs extend through openings 36 in the rim of the head and are adapted to engage under the upper side of the groove 27 when the head is in position on the top of the piston.

To assemble our improved piston, the sections 1, 2, 3 and 4 are placed in their relative positions but somewhat separated with connecting rod pin seats 21 and 22 in alignment. The springs 20 are then inserted in the bosses 19 and the ends of the pin of the connecting rod seated in seats 21 and 22. The head plate 25, or if the form shown in Figs. 11 to 14 is employed, the head 31 is placed in position on the upper ends of the piston wall sections. The sections are then pressed inwardly until the springs 20 are placed under compression and the edges 5 of the sections enter into contact. As the sections move inwardly the flange on the head plate enters the groove on the inner surface of the wall sections and the springs attached to the head hold it tightly against the upper end of the wall sections. The assembled piston may then be inserted in the cylinder, when springs 20 will automatically expand the wall sections outwardly against the cylinder walls making a gas tight joint therewith.

The arrangement of the tangential surfaces of the tongues of one section and the surfaces 9 of the depressions of an adjoining section is such that the expansive movement of the sections relative to each other under the action of the compression springs 20 tends to press these tangential surfaces together insuring a gas tight joint between the sections while allowing relative movement between them.

It is thus obvious that we have provided an improved piston which is simply constructed and readily assembled. The piston is self-aligning and self-adjusting within the cylinder for compensating for wear and for maintaining a gas tight fit between the piston and the cylinder walls. The improved construction of our piston obviates the necessity for providing piston rings and the attendant labor of renewal of such rings, it being unnecessary to remove the piston for adjustment as is the case where piston rings are employed.

What we claim is:

1. A hollow piston for use in internal combustion engines including a plurality of arcuate longitudinal sections having radially overlapping portions, and means for effecting the radial self-adjustment of the sections relative to the axis of the piston.

2. A hollow piston for use in an internal combustion engine cylinder or the like which is divided longitudinally into a plurality of arcuate sections, said sections being expansible automatically to maintain a tight fit within the cylinder, and having overlapping portions the abutting faces of said portions being parallel to the axis of the piston and adapted to slide tangentially over each other as the sections expand so as to maintain a tight fit between the sections.

3. A hollow piston for use in an internal combustion engine cylinder or the like, which is divided longitudinally along axial planes into a plurality of arcuate sections having overlapping portions, said sections being expansible automatically to maintain a tight fit within the cylinder, and the abutting faces of said portions being disposed in longitudinal planes substantially parallel to the axis so as to slide tangentially on each other as the sections expand, whereby the piston remains substantially gas tight as said sections expand.

4. A hollow piston comprising a plurality of longitudinally extending arcuate sections, the longitudinal edges of said sections having interfitting overlapping portions, and means interposed between adjacent sections tending constantly to effect radial adjustment of the sections relative to the axis of the piston.

5. A hollow piston comprising a plurality of longitudinally extending arcuate sections, the longitudinal edges of said sections having interfitting overlapping tongues, the tongues on one end of each section being disposed in a staggered relation to the tongues on the other edge of said section, and a tangentially disposed spring interposed between two of said sections and tending constantly to effect radial adjustment of said sections relative to the axis of the piston.

6. A hollow piston consisting of a plurality of longitudinally extending, arcuate sections having outer peripheral surfaces adapted to fit a cylinder, means constructed and arranged to exert force in tangential directions for sealing the joints between said sections, said sections being freely movable radially, and means for yieldingly holding said sections against the cylinder wall.

7. A hollow piston including a plurality of longitudinal sections having outer peripheral surfaces adapted to fit a cylinder, means for sealing the joints between said sections, said sections being freely movable radially, and springs interposed between adjacent sections for yieldingly holding said sections against the cylinder wall.

8. A piston for use in an internal combustion engine cylinder or the like, which is divided longitudinally along radial planes into a plurality of sections having overlapping portions, chambered bosses disposed along the longitudinal edges of said sections and interiorly of said piston, and springs disposed in said bosses tending to expand said sections to maintain a tight fit within the cylinder.

9. A piston for use in an internal combustion engine cylinder or the like, which is divided longitudinally along radial planes into a plurality of sections having overlapping portions, chambered bosses disposed in alignment along the contiguous longitudinal edges of said sections and interiorly of said piston, and springs disposed in said bosses tending to expand said sections to maintain a tight fit within the cylinder.

10. A piston for use in an internal combustion engine cylinder or the like, comprising a plurality of longitudinal sections having interengaging portions, said sections being expansible automatically to maintain a tight fit within the cylinder, and connecting rod pin seats disposed on opposite sections and interiorly of the piston.

11. A piston for use in an internal combustion engine cylinder or the like including a wall portion, a head portion, the said portions being provided with a cooperating flange and groove whereby the head portion is secured to the wall portion, and a plurality of springs secured to said head and reacting against said sections whereby normally to urge said head axially into contact with said sections.

12. A piston for use in an internal combustion engine cylinder or the like including a plurality of longitudinal wall sections, said sections being expansible automatically to maintain a tight fit with the cylinder, a head for closing one end of said piston, means for securing the head to said wall sections so as to permit their expansion, and resilient means urging said head in a direction axial of the piston whereby to provide a tight joint between said head and the expansible sections.

13. A piston for use in an internal combustion engine cylinder or the like including a plurality of longitudinal wall sections, said sections being expansible automatically to maintain a tight fit with the cylinder, a head for closing one end of said piston, means for securing the head to said wall sections so as to permit their expansion, a central boss on said head and springs secured in said boss and engaging the interior of said wall sections for maintaining a yielding tight fit between said sections and said head.

14. A hollow piston for internal combustion engines and consisting of a plurality of longitudinal arcuate wall members, a tongue extending from one of said members, one bounding surface of said tongue lying in a radial plane and a second bounding surface being parallel to the axis of said piston and a depression formed in an adjacent wall member, one bounding surface of said depression lying in the same radial plane as that of said tongue, and a second bounding surface coinciding with the second surface of said tongue whereby an adjustable fit is secured between said adjacent members that is gas tight both radially and longitudinally.

15. A piston for internal combustion engines comprising an annulus built up of supplemental interfitting overlapping segments having freedom of movement on each other to define a solid of greater or lesser diameter, the interfitting surfaces including overlapping portions maintaining gas-tight contact in respect to gas-flow from the exterior to the interior surface of the structure, and in respect to gas flow in the direction of the axis of the piston, having an end cap closing the void in said annulus, bearing means for a connecting rod on opposite segments and tangentially disposed springs interposed between adjacent segments.

Signed by us at Boston, Mass., this 21st day of May, 1919.

WALTER F. SOMES.
CHARLES H. B. MORSE.